(12) United States Patent
Madani et al.

(10) Patent No.: US 11,231,007 B2
(45) Date of Patent: Jan. 25, 2022

(54) CASCADED WIND TURBINE

(71) Applicant: University of Louisiana at Lafayette, Lafayette, LA (US)

(72) Inventors: Mohammad R. Madani, Lafayette, LA (US); Michael Stephen Davis, Lafayette, LA (US)

(73) Assignee: UNIVERSITY OF LOUISIANA AT LAFAYETTE, Lafayette, LA (US)

( * ) Notice: Subject to any disclaimer, the term of this patent is extended or adjusted under 35 U.S.C. 154(b) by 167 days.

(21) Appl. No.: 16/578,567

(22) Filed: Sep. 23, 2019

(65) Prior Publication Data

US 2020/0095975 A1    Mar. 26, 2020

Related U.S. Application Data

(60) Provisional application No. 62/734,363, filed on Sep. 21, 2018.

(51) Int. Cl.
*F03D 1/02* (2006.01)
*F03D 9/25* (2016.01)
*F03D 80/80* (2016.01)

(52) U.S. Cl.
CPC ............... *F03D 1/025* (2013.01); *F03D 9/25* (2016.05); *F03D 80/88* (2016.05)

(58) Field of Classification Search
CPC ............. F03D 1/025; F03D 9/25; F03D 80/88
See application file for complete search history.

(56) References Cited

U.S. PATENT DOCUMENTS

| 6,856,042 B1 * | 2/2005 | Kubota | ................... F03D 1/025 290/55 |
| 2017/0198678 A1 * | 7/2017 | Bakanov | ................. F03D 1/025 |

* cited by examiner

*Primary Examiner* — Viet P Nguyen
(74) *Attorney, Agent, or Firm* — Lauren J. Rucinski; Russel O. Primeaux; Kean Miller LLP

(57) ABSTRACT

The Cascaded Wind Turbine is a new concept of wind turbine design featuring multiple hubs in succession, each hub segment adds another tier that create a cascading blade configuration. Each blade set is connected to a separate rotor via a telescopic shaft.

8 Claims, 12 Drawing Sheets

CASCADED WIND TURBINE

CROSS REFERENCE TO RELATED APPLICATIONS

This application claims priority to the Provisional U.S. patent application No. 62/734,363 entitled "Cascaded Wind Turbine," filed Sep. 21, 2018.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the Cascaded Wind Turbine which may be embodied in various forms. It is to be understood that in some instances, various aspects of the invention may be shown exaggerated or enlarged to facilitate an understanding of the invention. Therefore the drawings may not be to scale.

BACKGROUND

Figure 1A:
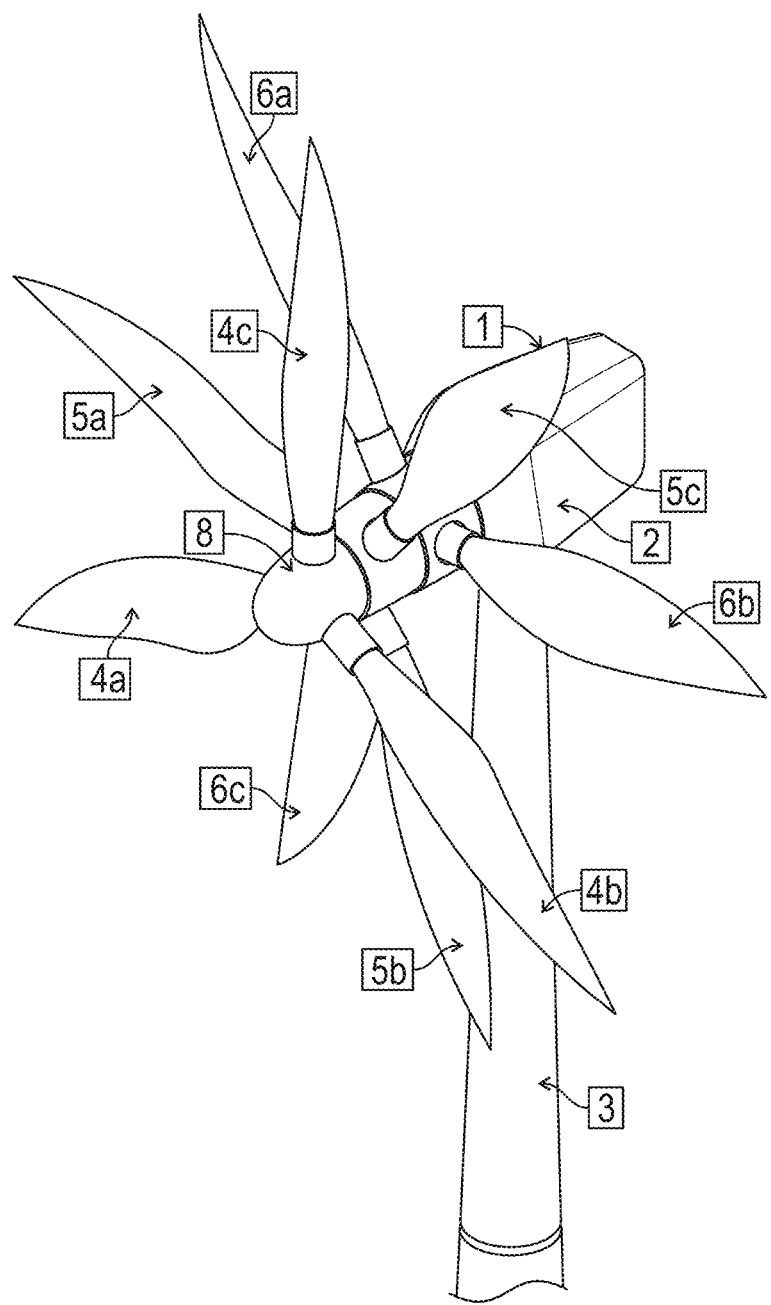
FIG. 1(a) is Cascaded Wind Turbine Isometric View

Due to the wind power industry's rapid growth and length of its historical development dating back to the first windmills, several wind turbine designs exist. The two most common types of wind turbines in use today are the horizontal axis and vertical axis wind turbines where the turbine blades extend upwards and are supported by a rotating framework.

There are several unconventional designs that either currently exist, are currently in development, or have been proposed due to their unique features. For example, a Co-Axial, Multi-Rotor wind turbine works on the concept that two or more rotors may be mounted onto the same driveshaft with their combined co-rotation together turning the same generator. Each rotor is exposed to fresh wind by sufficient spacing between rotors combined with an offset angle from the wind direction. This design allows for wake vorticity to be recovered as the top of a wake hits the bottom of the next rotor. Preliminary performance results indicate a 10 to 20 percent power gain, which is less efficient than what is being claimed by counter-rotating designs.

A Counter-Rotating Horizontal-Axis wind turbine operates on the principle that when a system expels or accelerates mass in one direction, the accelerated mass causes a proportional but opposite force on that system. The spinning blade of a single rotor wind turbine causes a significant amount of tangential or rotational air flow which then becomes wasted. To capitalize on this wasted rotational air flow, a second rotor is placed behind the first rotor on the opposite side of the nacelle to take advantage of the disturbed airflow, and this design claims a gain of up to 40 percent more energy from a given swept area as compared to a single rotor design. Additional advantages of this design include no gear boxes which reduce system weight and cost, as well as auto-centering on the wind, which translates to no yaw motors or mechanisms being required. Currently, no large practical counter-rotating wind turbines are commercially sold.

A Multi-Unit Rotor Blade System Integrated Wind Turbine features a set of propeller-type wind force collecting rotor turbines which is comprised of an up-wind auxiliary rotor blade turbine located on the front of the nacelle, and a down-wind main rotor blade turbine together with attached extender having twice the radius of the auxiliary rotor turbine. The rotor blades rotate in opposite directions with respect to one another, and the extender allows the main turbine to be activated by normal wind speed without aerodynamic wake turbulence effects created by the movement of the auxiliary rotor blade.

A Multi-Unit Rotor Blade System Integrated Wind Turbine features a set of propeller-type wind force collecting rotor turbines which is comprised of an up-wind auxiliary rotor blade turbine located on the front of the nacelle, and a down-wind main rotor blade turbine together with attached extender having twice the radius of the auxiliary rotor turbine. The rotor blades rotate in opposite directions with respect to one another, and the extender allows the main turbine to be activated by normal wind speed without aerodynamic wake turbulence effects created by the movement of the auxiliary rotor blade.

The Cascaded Wind Turbine is a new concept of wind turbine design featuring multiple hubs in succession (Leyline Hub), each hub segment adds another tier that create a cascading blade configuration. Each blade set is connected to a separate rotor via a telescopic shaft.

Applications for the Cascaded Wind Turbine ("turbine") would be in commercial electricity generation for wind-resource-rich areas that only allow for a limited number of wind turbine placements such as at the tops of hills or other limiting geolocations. The placement of the inventive turbine would potentially yield the equivalent power generation of approximately two (if two rotor hubs or used) or three conventional commercial wind turbines if three rotor hubs are used, so if only 10 wind turbines can be placed in a certain location, placing 10 of the inventive turbines would potentially yield the equivalent electricity generation of approximately 30 normal commercial wind turbines. The potential for residential applications also exist, allowing home owners to harvest electrical energy from the wind at potentially up to 3 times the rate of a conventional residential wind turbine, making wind energy significantly more appealing for practical sustainable use, especially in remote and high elevation locations without the need of connection to the local power grid.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

Figure 1B:
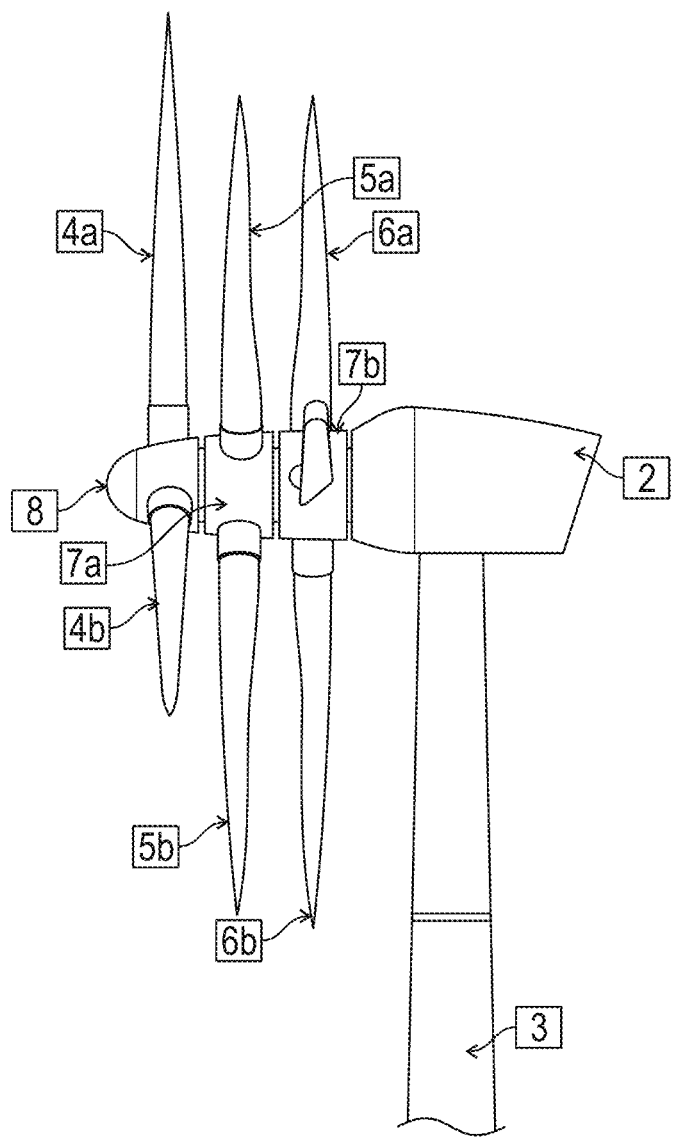
FIG. 1(b) is Side View.
Figure 1C:
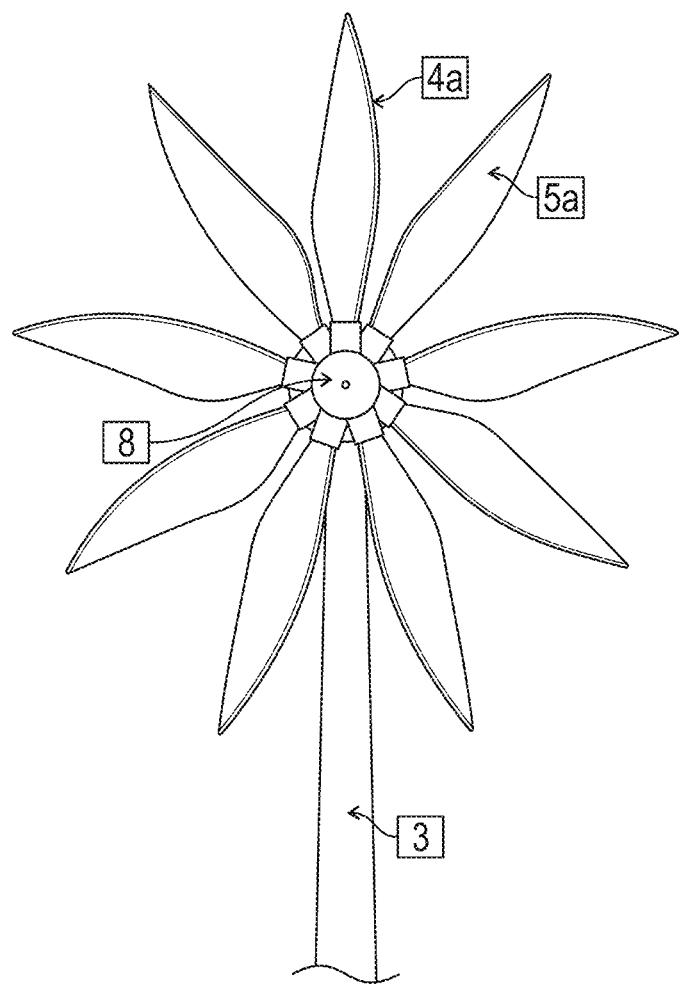
FIG. 1(c) is Front View.

The Cascaded Wind Turbine features multiple hubs in succession, with each hub segment adding another tier (FIG. 1(a)) that creates a cascading blade configuration as shown in FIG. 1(b). Each blade set is connected to a separate rotor via a telescopic shaft as shown in FIG. 1(c).

Turning to FIG. 1(a), the Cascaded Wind Turbine comprises a nacelle 1, a plurality of rotor blades 4, 5, 6, and a tubular base 3. As depicted in FIG. 1(b), the nacelle 1 further comprises a tier one hub 8 and two body hubs 7a, 7ab, or "tier two hub" and "tier three hub" respectively and a housing 2. In one or more embodiments, the nacelle comprises a plurality of hubs from tier one hub to tier n hub.

Figure 2A:
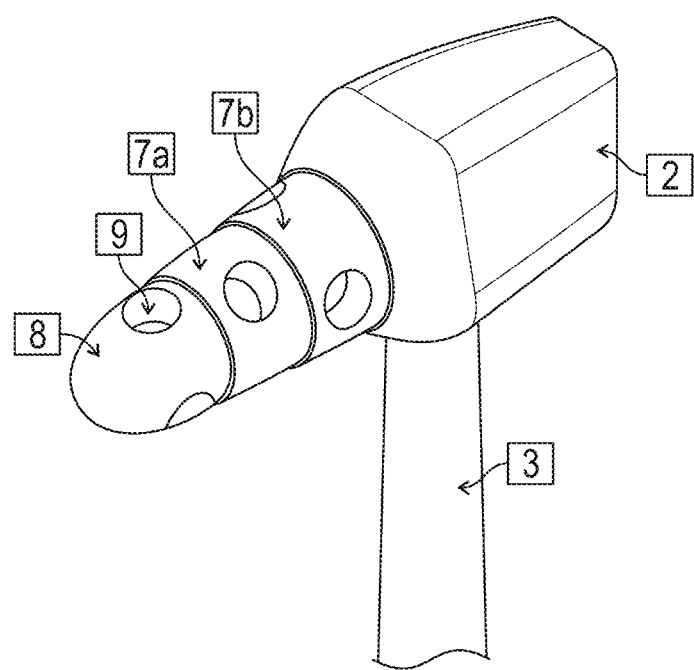
FIG. 2(a) depicts the multiple hubs.
Figure 2B:
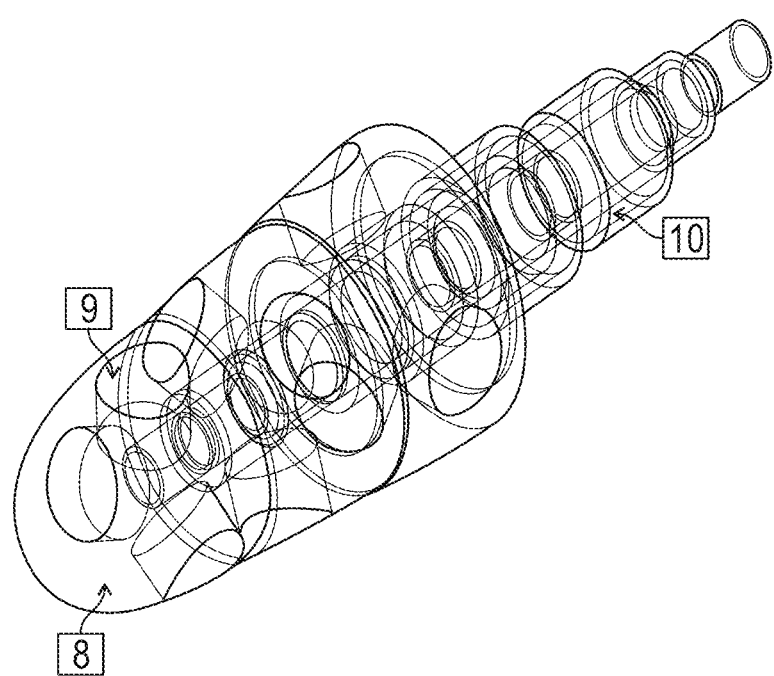
FIG. 2(b) show hidden lines of the hub and telescopic shaft.

Each hub 8, 7a, 7b, comprises a plurality of indentions 9 (FIGS. 2a, 2b). The indentions 9 are shaped and sized so as to accommodate the trailing edge of a blade 4, 5, 6. In one embodiment, as depicted in FIGS. 1(a), 1(b), and 1(c), the blades 4, 5, 6, are a singular shape and size. However, in one or more embodiments, the blades 4, 5, 6 may vary with regards to the chord length, radius, tip length, mid span length, and root length to accommodate desired swept area and rotor diameters and to maximize efficiency. In one embodiment, the blades are between 100 and 130 feet in length. However, in other embodiments (such as non-industrial embodiments), the blades may be smaller to accommodate the space available.

In one embodiment, the Cascaded Wind Turbine comprises individual blade sets 4a-c, 5a-c, 6a-c with varying blade lengths from the tier-1 hub 8 having the shortest blade length to tier-n hub using the longest blade length of the blade sets. This embodiment, utilizing varying blade lengths, is intended to minimize overall air flow impedance and blade-blocking synchronization time from forward tiers as shown in FIG. 2(a).

As depicted in FIGS. 1(a) and 1(b), each hub 8, 7a, 7b connects to three blades 4a-c, 5a-c, 6a-c. In other embodiments, varying number of blades may be used. For example, two blades may be attached to each hub. Or, three blades may be attached to one hub, and two blades on the other two hubs. The combination of number of blades per hubs is driven by the optimal efficiency achievable.

Figure 3A:
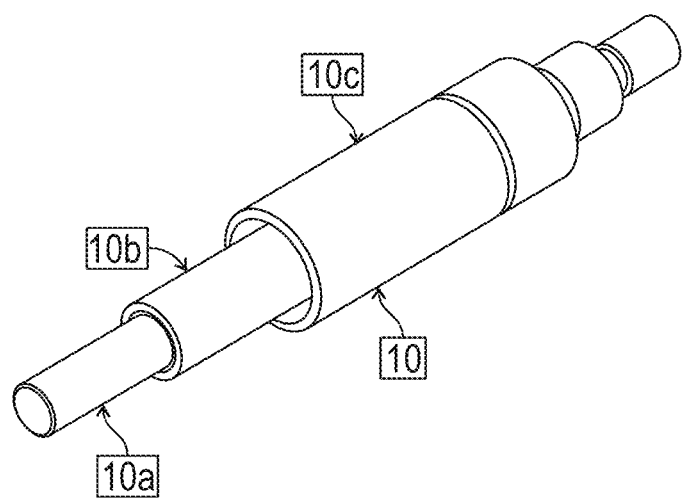
FIG. 3(a) shows the telescopic shaft
Figure 3B:
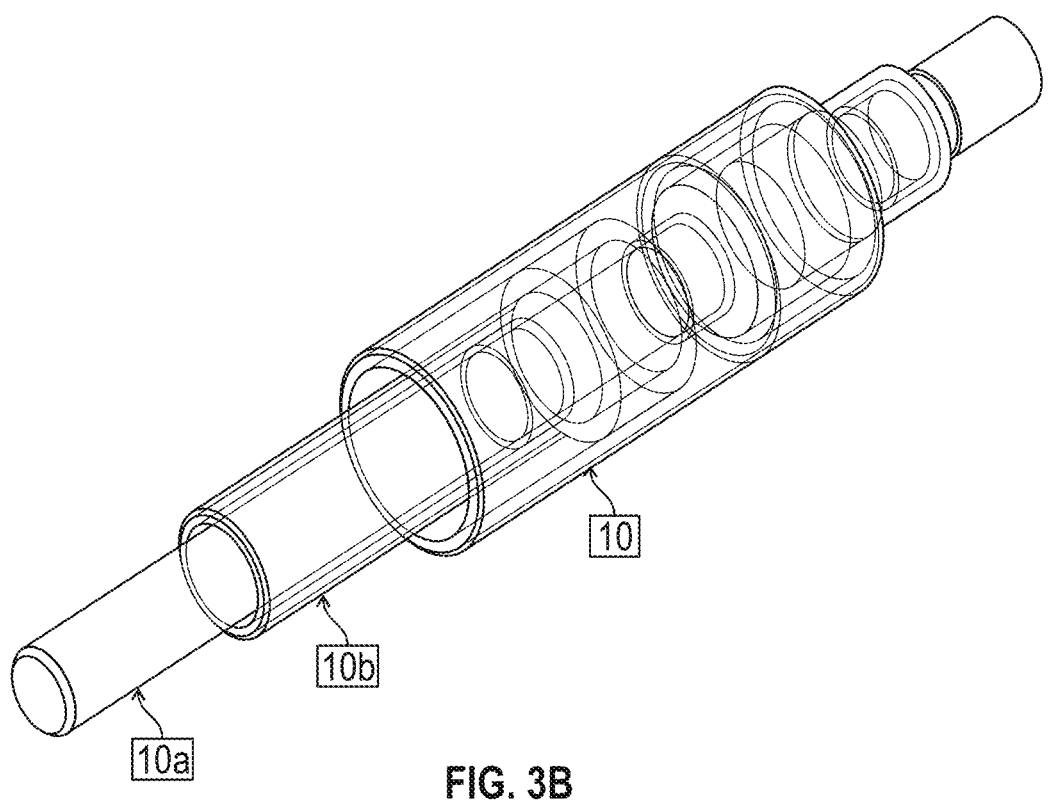
FIG. 3(b) shows hidden lines of the telescopic shaft.

As shown in FIG. 2b, each hub is connected to a telescopic shaft 10 (shown in FIGS. 3(a) and 3(b)). This means that each hub 8, 7a, 7b (as depicted in FIG. 1(b)) may spin at a different rate than the other hubs. The telescopic shaft 10 may comprises three sections. In other embodiments, the telescopic shaft 10 comprises a plurality of sections based on the number of hubs 8, 7a, 7b and desired efficiency and power generation.

As depicted in FIGS. 3a and 2(a), blades 4a, 4b, and 4c spin so that the nose hub 8 rotates and the blades spin the inner most shaft 10a which is connected to its own rotor; blades 5a, 5b, and 5c spins to that the tier two hub 7a rotates and the blades spin the outer most 10c, which is connected to its own rotor; and blades 6a, 6b, 6c spin so that the tier three hub 7b rotates and the middle shaft 10b spins, which is also connected to its own rotor. Thus, the inner most shaft 10a is capable of spinning independently of the middle shaft 10b, which is capable of spinning independently of the outer most shaft 10c and each blade set 4a-c, 5a-c, 6a-c is connected to its own rotor by the telescoping shaft section 10a-c.

The telescopic shaft 10 then interfaces with a generator located in the housing 2, which allows for up to 3 times the power generation of a conventional commercial wind turbine by utilizing multiple successive energy extraction points. In some embodiments, the shaft 10 and generator may be connected by a gear box which increases the RPM. In other embodiments, there is no gear box; rather, a direct drive generator is used.

The Cascaded Wind Turbine may further comprise a plurality of sensors and controllers. In one or more embodiments, the Cascaded Wind Turbine comprises an anemometer which transmits wind speed data to a controller so that the controller is capable of starting and stopping the spinning of the various blades based on the wind speed. In one or more embodiments, the controller may be automatic or may require manual intervention, such as from a human observer. In one or more embodiments, the controller is in communication with a brake assembly.

In one or more embodiments, the Cascaded Wind Turbine may also comprise a yaw drive, motor, and sensor that regulates the direction of the blades to keep them facing the wind. In other embodiments, such as if the Cascaded Wind Turbine is facing downwind, a yaw drive, motor, and sensor is not used.

In one or more embodiments, the Cascaded Wind Turbine may further comprises a controller to prevent blade-blocking synchronization time. This is important to ensure that each set of blades 4a-c, 5a-c, 6a-c is in contact with the optimal amount of wind force.

In the depicted embodiment, the nacelle 1 is connected at the bottom to a stand 3. The stand 3 may be made of steel, concrete, or any other suitable material. In one or more embodiments, the stand is tubular. However, other shapes may be used as appropriate. The stand is fixed to the ground in a manner capable of supporting the weight of the nacelle 1, blades 4, 5, 6, hubs 8, 7a, 7b, and housing 2. The height of the stand 3 may vary depending on the wind conditions. In one or more embodiments, the stand is between 200 and 300 feet. In one or more embodiments, such as offshore applications, the stand may be capable of withstanding tidal or wave forces.

Figure 5:
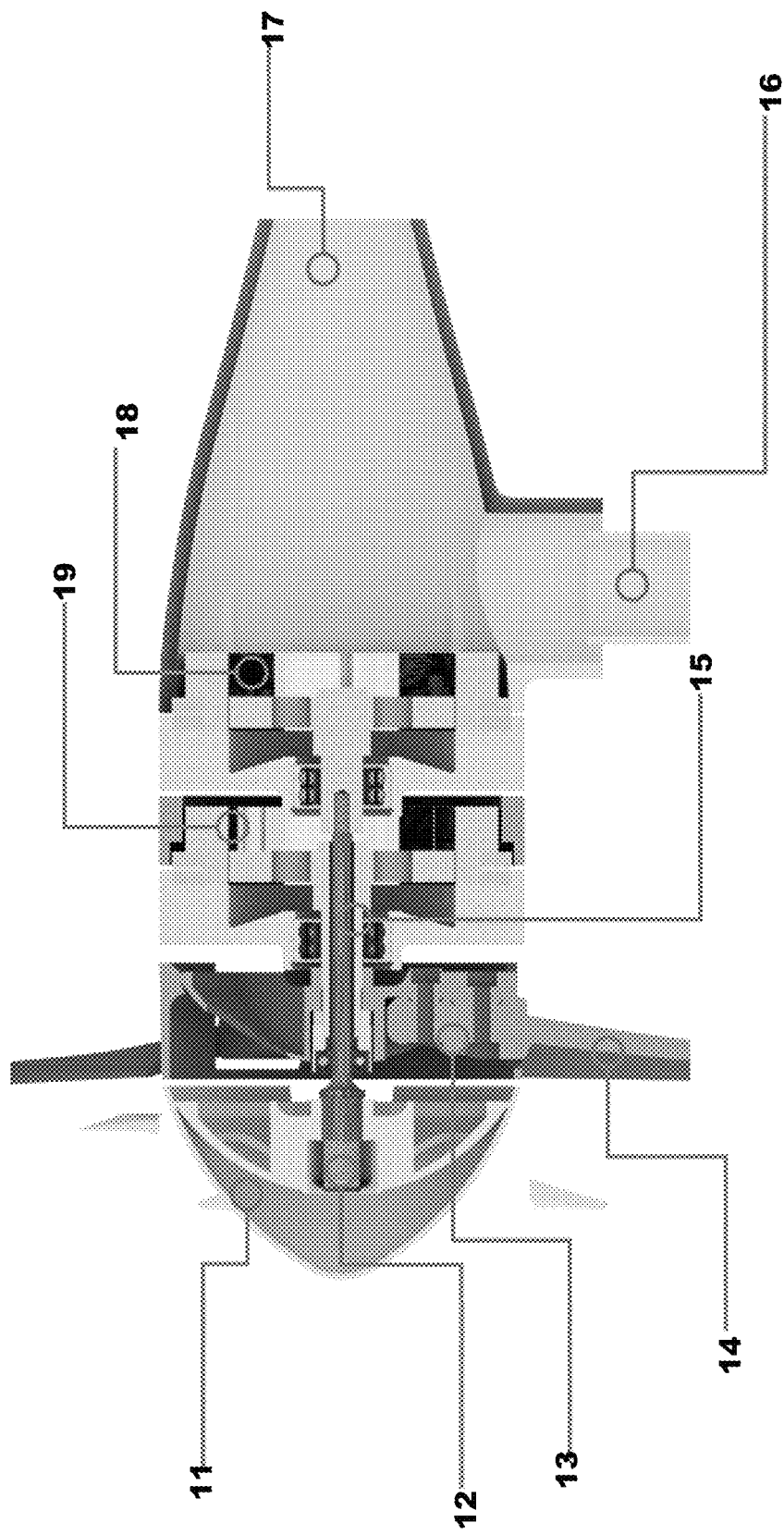
FIG. 5 is a cut-a-way view of one embodiment of the Cascaded Wind Turbine.
Figure 6:
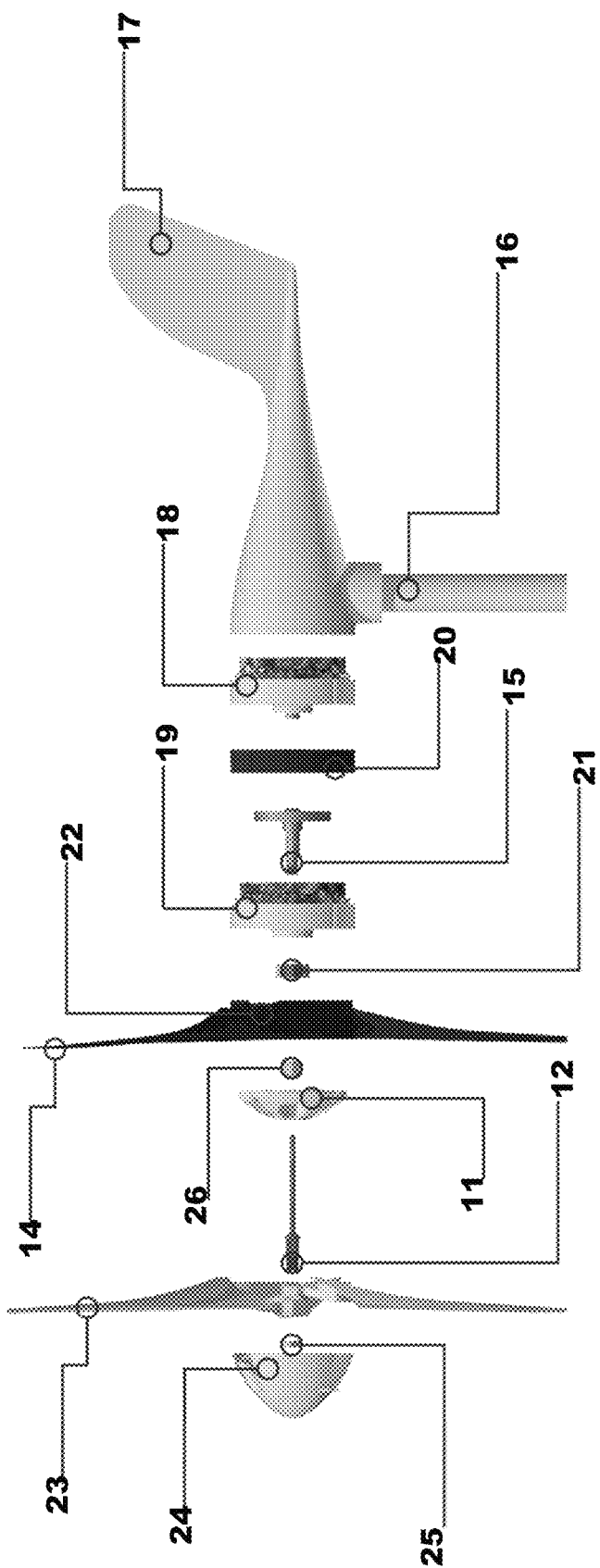
FIG. 6 is a second exploded view of one embodiment of the Cascaded Wind Turbine.
Figure 7:
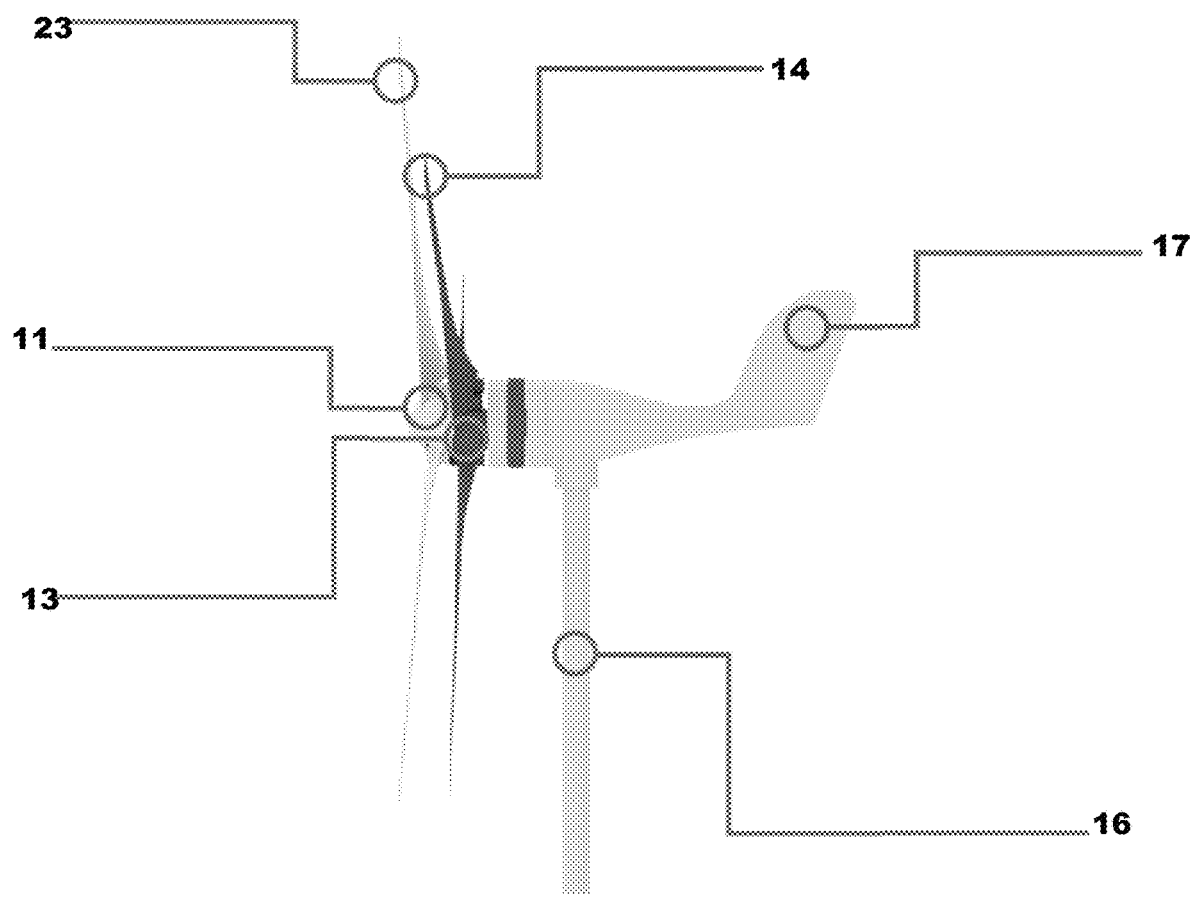
FIG. 7 is one embodiment of the Cascaded Wind Turbine.

FIGS. 4 through 8 depict another embodiment of the Cascaded Wind Turbine with two blades and two hubs. FIG. 7 depicts two tiers of blades: tier 1 blades 23 and tier 2 blades 14. The tiers of blades 23, 14 are each connected to a rotor hub 11, 22.

Turing to FIG. 6, a tier-1 hub cover 24 is attached to the tier-1 blades 23 with a tier-1 telescopic rotor shaft bearing 25. In the depicted embodiment, the tier-1 blades 23 comprises 3 blades. In other embodiments, there may be more or less blades to accommodate wind speed and direction in the particular area. The tier-1 telescopic rotor shaft bearing 25 is also in communication with the tier-1 telescopic rotor shaft 12. The tier-1 rotor hub 11 is also in communication with the tier-1 telescopic rotor shaft 12. The tier-1 hub cover 24, tier-1 blades 23, tier-1 telescopic rotor shaft bearing 25, and tier-1 telescopic rotor shaft 12 make up the tier-1 blade set. The tier-1 blade set also comprises a tier-1 generator 18.

Figure 4:
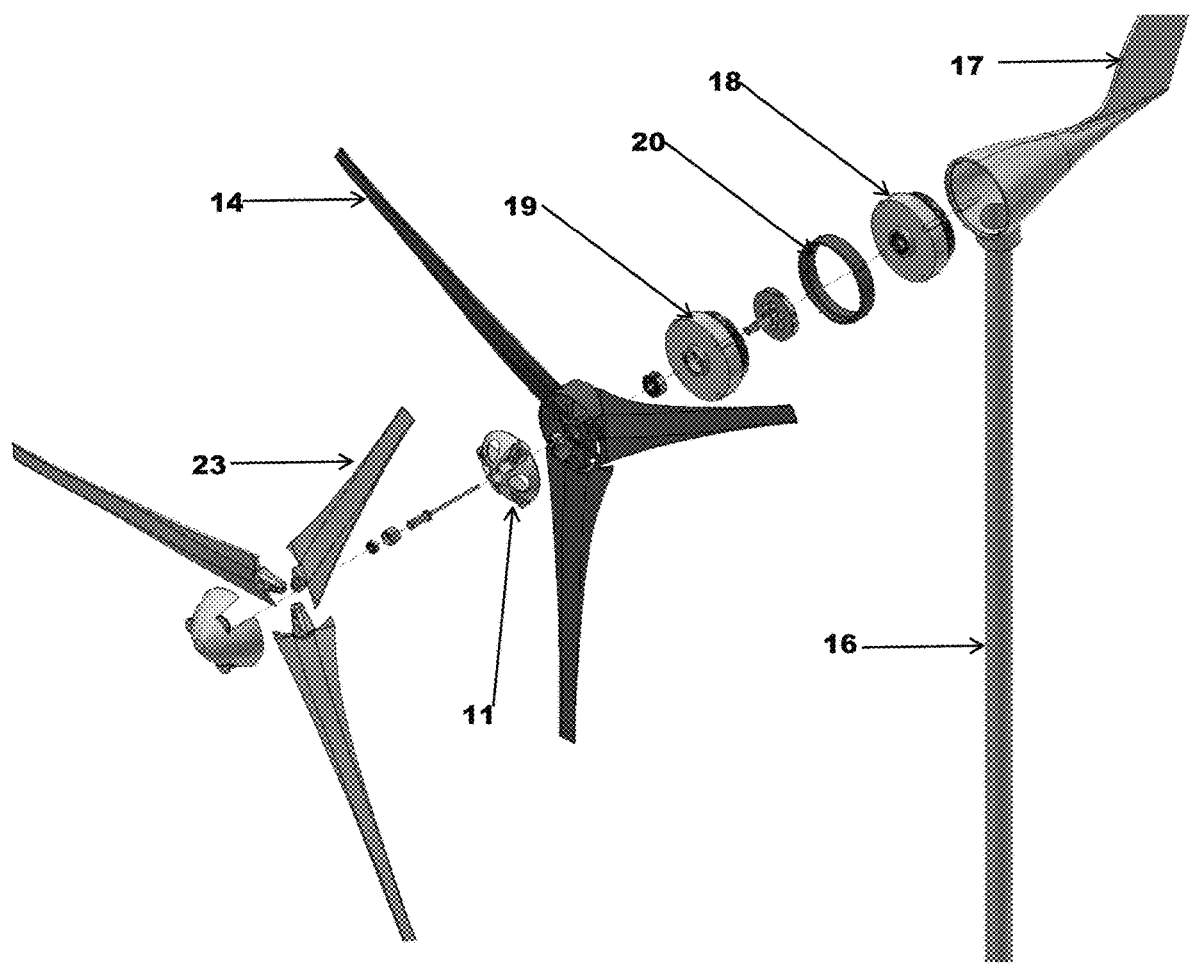
FIG. 4 is an exploded view of one embodiment of the Cascaded Wind Turbine.
Figure 8:
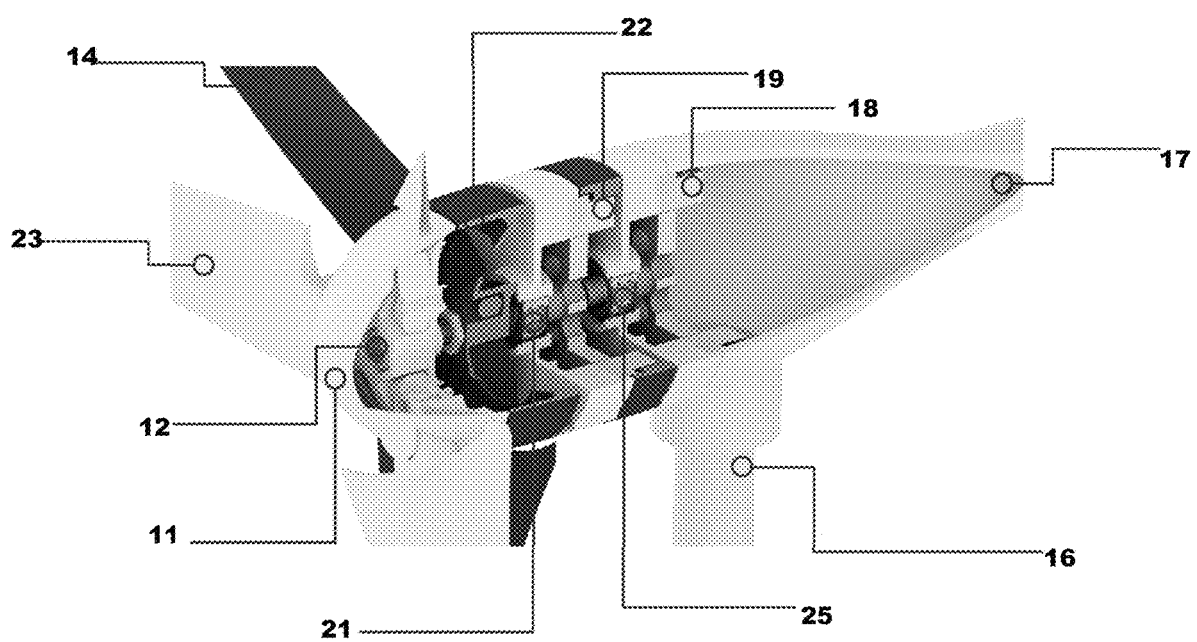
FIG. 8 is an assembled view of one embodiment of the Cascaded Wind Turbine.

Similarly, the tier-2 blades 14 are in rotational communication with the tier-2 telescopic rotor shaft bearing 21, tier-2 telescopic rotor shaft 15, and a tier-3 generator 19, all of these components making up the tier-2 blade set. In one or more embodiments, a dust cover 20 is used to protect the rotating equipment. Because each blade set is connected to a separate rotor by the telescopic shafts 12, 15 the blade sets may rotate independent of the other, creating the cascading blade effect. FIG. 4 provides a perspective view of this embodiment along with the turbine support structure 16 and turbine nacelle 17. FIGS. 5 and 8 depict an interior view of this embodiment assembled.

For the purpose of understanding the Cascaded Wind Turbine, references are made in the text to exemplary embodiments of a Cascaded Wind Turbine, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

The invention claimed is:

1. A wind turbine comprising:
    a. a nacelle comprising a first hub and a second hub, said second hub being aft of said first hub and each hub being connected to a rotating shaft;
    b. a plurality of blades connected at one end to either said first hub or said second hub, wherein each of said hubs has at least one of said plurality of blades connected to it;
    c. a generator connected to said rotating shaft; and
    d. a stand connected to the bottom of said nacelle;
    wherein said rotating shaft comprises a first telescoping section which telescopes within a second telescoping section, and wherein said first and second telescoping sections rotate independently of one another; and wherein said first hub is connected to and rotates with said first telescoping section and said second hub is connected to and rotates with said second telescoping section.

2. The wind turbine of claim 1 wherein said first hub and said second hub each comprise at least three blades.

3. The wind turbine of claim 1 further comprising a plurality of sensors capable of rotating said plurality of blades based one or more parameters selected from the group consisting of wind speed and wind direction.

4. The wind turbine of claim 1 further comprising a controller capable of preventing blade-blocking synchronization time.

5. The wind turbine of claim 1 wherein said rotating shaft further comprises a third telescoping section such that said second telescoping section telescopes within said third telescoping section and a third hub is rotatably connected to said third telescoping section and at least one of said plurality of blades is connected to said third hub.

6. A wind turbine comprising:
    a. a tier-1 rotor hub in connection with a tier-1 rotor shaft, wherein said tier-1 rotor shaft comprises a tier-1 rotor shaft bearing;
    b. a tier-2 rotor hub being aft of said tier-1 rotor hub and in connection with a tier-2 rotor shaft, wherein said tier 1 rotor shaft fits telescopically within said tier-2 rotor shaft, wherein said tier-2 rotor shaft comprises a tier-2 rotor shaft bearing, and wherein said tier-2 rotor shaft rotates independently of said tier-1 rotor shaft;
    c. at least two tier-1 blades connected at the trailing edge of said at least two tier-1 blades to said tier-1 rotor hub;
    d. at least two tier-2 blades connected at the trailing edge of said at least two tier-2 blades to said tier-2 rotor hub;
    e. a tier-1 generator in communication with said tier-1 rotor shaft; and
    f. a tier-2 generator in communication with said tier-2 rotor shaft.

7. The wind turbine of claim 6 further comprising a turbine support structure.

8. The wind turbine of claim 6 further comprising a plurality of sensors capable of rotating said plurality of blades based one or more parameters selected from the group consisting of wind speed and wind direction.

* * * * *